United States Patent
Haj-Yihia

(10) Patent No.: US 9,323,307 B2
(45) Date of Patent: Apr. 26, 2016

(54) ACTIVE DISPLAY PROCESSOR SLEEP STATE

(75) Inventor: Jawad Haj-Yihia, Haifa (IL)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 13/341,767

(22) Filed: Dec. 30, 2011

(65) Prior Publication Data

US 2012/0102342 A1     Apr. 26, 2012

(51) Int. Cl.
   G06F 1/32      (2006.01)
   G06F 3/14      (2006.01)
   G09G 5/391     (2006.01)

(52) U.S. Cl.
   CPC ............ *G06F 1/3203* (2013.01); *G06F 1/3265* (2013.01); *G06F 1/3287* (2013.01); *G06F 3/14* (2013.01); *G09G 5/391* (2013.01); *G09G 2330/021* (2013.01); *Y02B 60/1242* (2013.01); *Y02B 60/1282* (2013.01)

(58) Field of Classification Search
   CPC .......... G06F 1/32; G06F 1/26; G06F 1/3218; G06F 1/3265; G06F 1/3203; G06F 1/3287; G06F 3/14; Y02B 60/1242; Y02B 60/1282; G09G 5/363; G09G 5/391; G09G 2330/021
   USPC .................. 713/300, 310, 320–324, 330, 340
   See application file for complete search history.

(56) References Cited

U.S. PATENT DOCUMENTS

| | | | |
|---|---|---|---|
| 6,098,174 A * | 8/2000 | Baron et al. ................... 713/300 |
| 6,343,222 B1 * | 1/2002 | Jones ............................ 455/574 |
| 6,351,674 B2 * | 2/2002 | Silverstone ..................... 607/46 |
| 6,785,829 B1 * | 8/2004 | George et al. ................. 713/320 |
| 7,149,909 B2 * | 12/2006 | Cui et al. ...................... 713/322 |
| 7,222,253 B2 * | 5/2007 | Samson et al. ................ 713/323 |
| 7,256,788 B1 | 8/2007 | Luu et al. |
| 8,102,398 B2 * | 1/2012 | Bajic et al. .................... 345/503 |
| 8,732,496 B2 * | 5/2014 | Wyatt ............................ 713/320 |
| 2003/0120958 A1 | 6/2003 | Zhang et al. |

(Continued)

FOREIGN PATENT DOCUMENTS

EP           0699986 A2      3/1996

OTHER PUBLICATIONS

PCT/US2012/068529 Notification of Transmittal of the International Search Report and the Written Opinion of the International Searching Authority, mailed Mar. 29, 2013, 12 pages.

(Continued)

*Primary Examiner* — Fahmida Rahman
(74) *Attorney, Agent, or Firm* — Nicholson De Vos Webster & Elliott LLP

(57) ABSTRACT

Power consumption and dissipation is reduced during active display of content from an internal display buffer using a power supply topology that powers a display subsystem separately from the other components of a CPU. The power supply topology enables a processor to enter a sleep state without disabling the active display of content. The processor enters a processor sleep state when the display buffer is full and the processor components are no longer needed. The processor exits the processor sleep state when the display buffer is empty and operates in conjunction with the display subsystem to fill the buffer with more content. The processor continues to enter and exit the processor sleep states as appropriate until active display ends.

17 Claims, 3 Drawing Sheets

(56) References Cited

U.S. PATENT DOCUMENTS

2006/0092675 A1    5/2006  Kajita
2007/0109292 A1*  5/2007  Dahan et al. .................. 345/211
2007/0113111 A1*  5/2007  Dahan et al. .................. 713/300
2009/0301190 A1* 12/2009  Ross et al. .................. 73/304 C
2011/0304306 A1* 12/2011  Galal et al. .................... 323/282

OTHER PUBLICATIONS

PCT/US2012/068529 Notification Concerning Transmittal of International Preliminary Report on Patentability, mailed Jul. 10, 2014, 9 pages.

* cited by examiner

ACTIVE DISPLAY PROCESSOR SLEEP STATE

TECHNICAL FIELD

The technical field is electronic systems and power management, particularly processor power management and processor sleep states.

BACKGROUND

As the trend toward advanced microprocessors, e.g. central processing units (CPUs), with more transistors and higher frequencies continues to grow, computer designers and manufacturers are often faced with corresponding increases in power and energy consumption. Particularly in mobile devices, such as laptop computers, wireless handsets, personal digital assistants, tablet computers, etc., increased power consumption can lead to overheating, which can negatively affect performance and significantly reduce battery life. Because batteries typically have a limited capacity, running the processor of a mobile device more than necessary could drain the capacity more quickly than desired.

To manage power consumption, today's high end CPUs have two distinct power-down modes—C-states and S-states. In C-states the CPU is put into sleep mode while maintaining context and appearing architecturally active to the system, also referred to as an idle state. In S-states the CPU is powered off and a boot process is required to restart it. Operating systems typically support a built-in power management software interface such as Advanced Configuration and Power Interface, (ACPI), an open industry specification standard first published in 1996, in which the CPU is placed into lower power sleep states based on reduced activity or demand. Among other aspects, the ACPI defines the lower power sleep states as a progression of C-states that can be supported by processors and/or chipsets.

Alternatively or in addition to ACPI, high end CPUs employ proprietary power management interfaces that define other C-states, referred to as enhanced C-states, in which different combinations of processor clocks are turned off and the processor voltage is reduced to a lower data retention point to achieve even deeper sleep states and greater reductions in power consumption. These additional sleep states are generally characterized by similar or equivalent semantics as the ACPI C-states, in which a higher numbered C-state generally consumes lower power than a lower numbered C-state, albeit with generally higher exit latencies.

In operation, to enter the deeper sleep states, a power management interface typically detects a time slot in which there are no new or pending interrupts to the processor. The power management interface then uses an input/output (I/O) controller or other chipset feature to place the processor into the deeper sleep states. For example, entry into deeper sleep states is typically achieved by referencing an external voltage reference in a processor voltage regulator (VR) circuit and regulating to this reference voltage whenever a platform "Deeper Sleep" signal such as a DPRSLPVR signal or other similar signal is asserted by an I/O controller or other integrated circuit. The VR then transitions from a first voltage to a second lower voltage associated with the deeper sleep state including, for certain sleep states, a zero voltage. Upon exiting the deeper sleep state, the VR transitions back to a higher voltage within a specified time window.

After a processor has been placed into the deeper sleep state, a break event or interrupt from the operating system or another source may be sent to the chipset, and the chipset will then allow the processor to exit the deeper sleep state. The ability to transition between various power management states, including deeper sleep states, enables power consumption and dissipation to be reduced and battery life to be increased.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
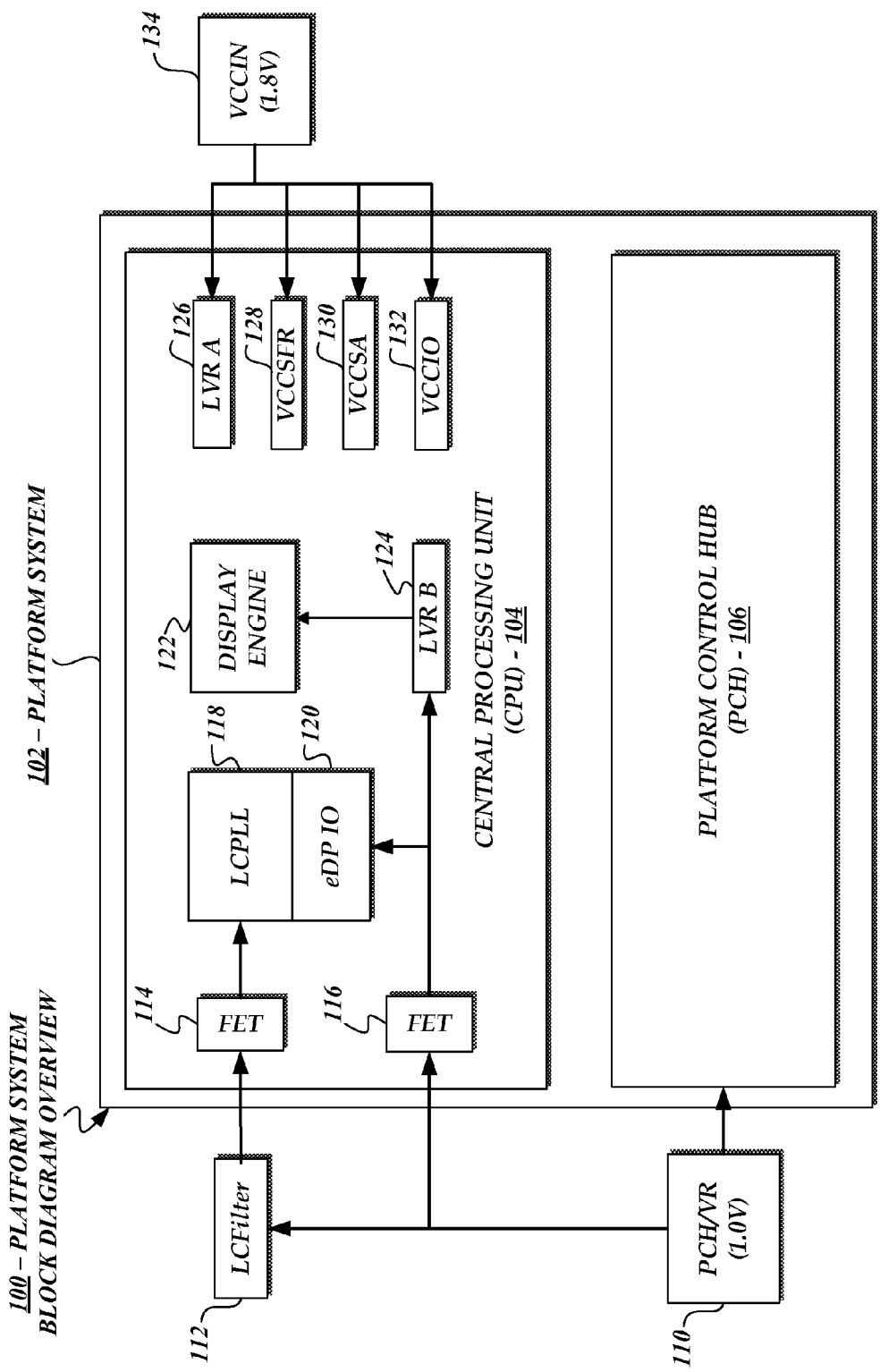
FIG. 1 is a block diagram of an exemplary platform system in which processor sleep states having an active display may be implemented according to one embodiment of the present invention.

In the description that follows, numerous specific details are set forth to provide a thorough explanation of embodiments of methods, media and systems for processor sleep states having an active display. The details are intended to facilitate an understanding of the invention through the description of exemplary embodiments of the invention. However, those details are not intended to limit the invention to the particular embodiments described. Variations and other embodiments are within the scope of the invention.

As will be apparent to one skilled in the art, an embodiment of the invention can be practiced without one or more of the specific details set forth in this description. In addition, certain well-known components, structures, and techniques have not been shown in detail so as to not obscure the understanding of the invention.

Certain details depicted in the figures, including details that comprise hardware (e.g. circuitry, dedicated logic, firmware, microcode, etc.), software (such as is run on a general-purpose computer system or a dedicated machine or device), or a combination of both, are provided for purposes of illustration. However, as will be apparent to one skilled in the art, hardware and/or software other than that which is depicted in the figures or described in the application may be employed in an embodiment while remaining within the scope of the invention.

Throughout the description, some of the details are set forth in terms of sequential operations. However, as will be apparent to one skilled in the art, some of the operations may be performed in a different order than described, including being performed in parallel rather than sequentially, while remaining within the scope of the invention.

Lastly, reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

Turning now to the detailed description, a processor, or CPU, in which embodiments of the invention may be employed is typically powered by an external voltage regulator (VR) and multiple internal voltage regulators that are integrated inside the CPU die, referred to as fully integrated voltage regulators (FIVRs). The use of multiple FIVRs in the CPU die enables the grouping of components on the CPU die into separate power planes, such that power is regulated and supplied by the FIVR to only those components in the group. During power management, a given power plane of one FIVR may be powered down or off when the processor is placed into a certain sleep state, while another power plane of another FIVR remains active, or fully powered.

On an integrated CPU with a chip display driver or engine, a CPU cannot enter into certain sleep states because of the need to supply power and connectivity to the display subsystems. For example, when a platform system's display is on and is working from the display internal buffer to display content, certain other components of the CPU cannot be powered down even if they are idle. This inefficient use of power can be due, at least in part, to the display subsystem sharing power planes with the other components, such as the FIVRs, I/O controllers, the VccIN CPU voltage supply, sensors, and the like. The inefficiency occurs when the other components sharing the power plane remain powered on even though they are not needed.

For example, when a platform system's display is on, after filling the display's internal buffer, only three components of the display subsystem are typically needed to display content from the internal buffer: the display IO controller, the display logic (display engine), and the display PLL. Currently, these three components of the display subsystem share a power source with the various FIVRs in the system and the VCCIN input voltage to the CPU.

The display IO controller is typically powered from an IO FIVR which powers most of the IO controllers in the system. Gating the IO controllers that are not needed while leaving the display IO controller active to prevent power dissipation in the IO FIVR is generally ineffective, and results in an inefficient use of power.

The display logic (or display engine) is typically powered from the System Agent (SA) FIVR. Currently, when a platform system's display is on and the System Agent is in idle mode, most of the SA FIVR components are power gated and other logic components are clock gated. Nevertheless, power dissipation on the power gate and ungated portions of the SA domain results in the inefficient use of power. In addition, the display engine by itself consumes relatively low current from the SA FIVR, which results in a significant drop in power efficiency and power loss on the SA FIVR during SA idle mode.

The display PLL is typically powered from a linear voltage regulator (LVR) on the VCCIN input voltage to the CPU. The VCCIN also powers various FIVRs on the CPU. To save power during certain sleep states, the voltage on the VCCIN is dropped, sometimes to a zero voltage. Thus, when the platform system's display is on, it cannot enter certain sleep states to save power, as that would turn off the display as well. This results in the inefficient use of power, since the components that would otherwise have been turned off during the sleep states remain powered on and idle.

Among other advantages, embodiments of the present invention address the above-described inefficiencies in the use of power. Specifically, embodiments of the present invention include methods, media and systems to enable processors to enter sleep states while maintaining an active display subsystem. In one embodiment, a platform system is configured for an active display processor sleep state in which a power supply topology powers the display subsystem separately from the other components of the CPU. In one embodiment, the power supply topology powers the display subsystem's components using an external power supply while the rest of the CPU's components are powered down. In one embodiment, the power supply topology powers the display engine component of the display subsystem using a dedicated input voltage with an on die voltage regulator. In one embodiment, the power supply topology powers the display Phase Locked Loop (PLL) component using a dedicated input voltage with on board noise filtering. In one embodiment, the on die voltage regulator and/or the on board noise filtering advantageously enables sharing the same external power supply among the display subsystem's components.

FIG. 1 illustrates a block diagram overview 100 of an exemplary platform system 102 in which a processor can be placed into a sleep state while maintaining an active display subsystem according to one embodiment of the present invention. The platform system 102 can be a laptop computer, notebook computer, and electronic tablet or reading device, camera, personal digital assistant, wireless cellular telephone/handset, smart phone or any other type of mobile electronic system or mobile computing device. The platform system 102 can also be a stationary system such as a desktop or enterprise computing system. Other types of electronic systems are also within the scope of embodiments of the invention.

The platform system 102 is configured in accordance with an embodiment of the invention. The platform system 102 includes, among other components not illustrated so as not to obscure the invention, a CPU 104 and a PCH 106. In one embodiment, the CPU 104 may be an Intel® architecture microprocessor including one or more processing cores and at least one execution unit to process instructions. It should be appreciated that any suitable number of processing cores may be utilized without departing from the scope of the embodiments described herein. In other embodiments, the processor 104 may be a different type of processor such as a digital signal processor, an embedded processor, or a microprocessor from a different source.

In one embodiment, the CPU 104 includes the following display subsystem components: a display Phase Locked Loop such as an LCPLL 118, a display I/O controller, such as an eDP IO 120 and display logic, such as a display engine 122. Various FIVRs, such as the VCCSFR 128, the VCCSA 130 and the VCCIO 132, as well as a linear VR, such as LVR A 126, are powered by the VCCIN 134 input voltage to the CPU 104.

As described earlier, currently, the display subsystem components share a power source with the various FIVRs and the VCCIN input voltage to the CPU. For example, using the illustrated platform system in FIG. 1, the eDP IO 120 might be powered by the VCCIO 132, the display engine 122 might be powered by the VCCSA 130, and the LCPLL 118 might be powered by the VCCIN 134 as regulated by the LVR A 126. However, in the illustrated embodiment, the power supply topology advantageously powers the display subsystem separately from the other components using another external voltage regulator, the PCH/VR 110 that already powers the PCH 106.

In one embodiment, the display engine 122 is powered using a dedicated input voltage supplied by the PCH/VR 110. Since the display engine 122 operates natively at 0.7V, and the dedicated input voltage supplied by the PCH/VR 110 is 1.0V, a second on die voltage regulator, LVR B 124 will regulate the voltage received from the PCH/VR 110 via an FET 116 down to 0.7V.

In one embodiment, the eDP 10 is also powered using the PCH/VR 110. Since the eDP IO already operates at 1.0V, no additional voltage regulation is needed. In one embodiment, the LCPLL 118 is also powered using the PCH/VR 110. Because the LCPLL can also operate at 1.0V, no additional voltage regulation is needed. However, in one embodiment an LCfilter 112 via FET 114 is added to reduce or eliminate noise.

In an embodiment, during operation of the platform system 102 the CPU may be intermittently placed into a sleep state, in which the VCCIN voltage is reduced or set to zero while at the same time all of the display subsystem components that are now powered via the PCH/VR remain active. This advantageously allows the system to efficiently conserve power while the display system is on. Power savings are anticipated to be significant during average CPU workloads with the display on. For example, during a video playback workload, the power savings is on average approximately 200 mw, when compared to current power supply topologies on the CPU.

Figure 2:
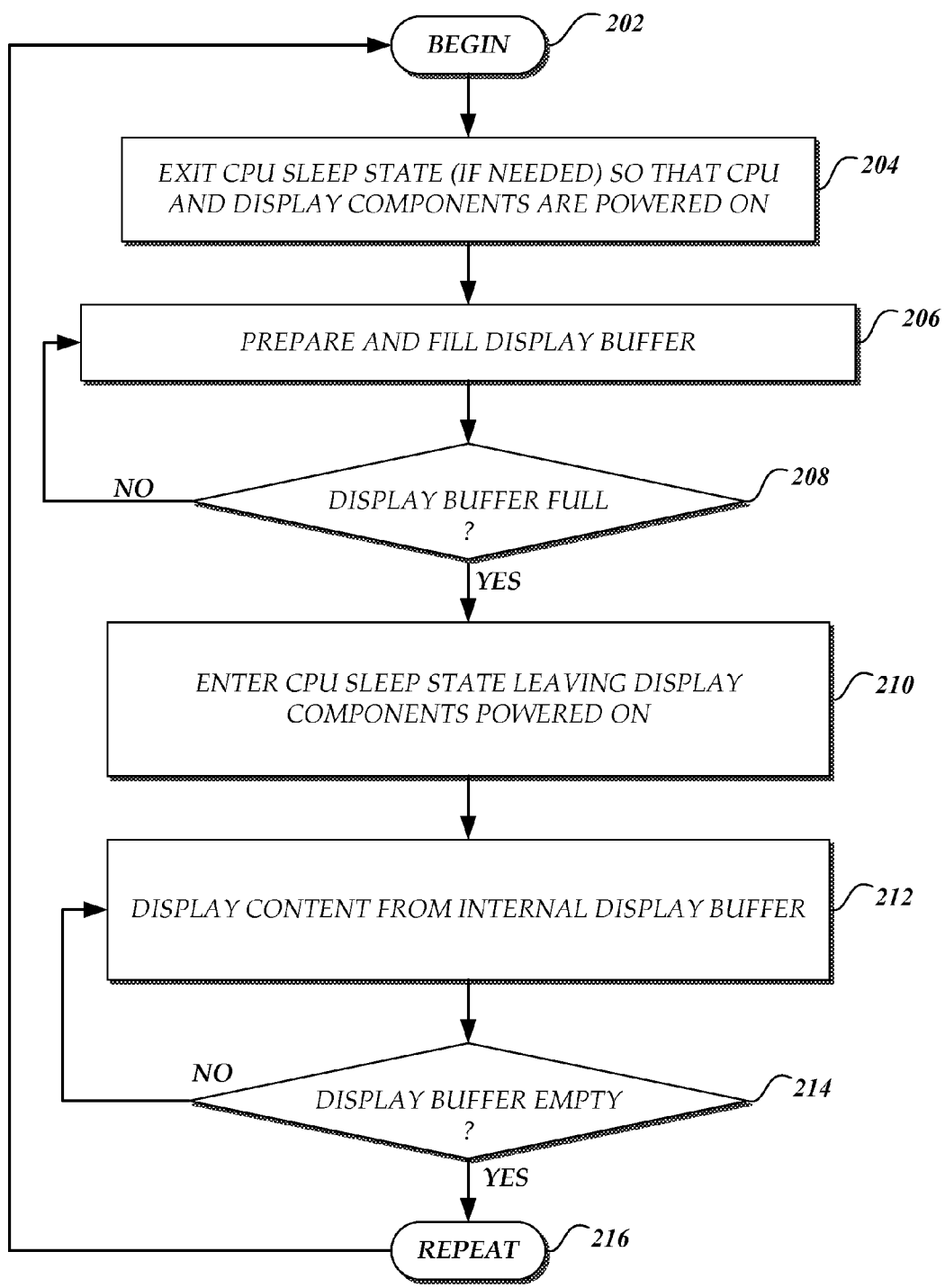
FIG. 2 is a flow diagram illustrating a process that may be utilized to enter a processor into sleep states having an active display, according to one embodiment of the present invention.

FIG. 2 is a flow diagram overview of a process 200 that a platform system may employ to exploit the power supply topology that powers the display subsystem separately from the other components of the CPU as illustrated in FIG. 1, and in accordance with an embodiment of the present invention. With reference to FIG. 2, the process 200 begins 202 at process block 204 in which a system exits a CPU sleep state (if needed) so that the CPU and display subsystem components are both powered on. This allows the system, at process block 206, to prepare and fill an internal display buffer with content while the CPU is active.

In one embodiment, the process 200 continues at decision block 208, in which the system determines whether the display buffer is full. If not, then the flow returns to process block 206 to continue to prepare and fill the internal display buffer. If the buffer is full, then the flow continues to process block 210, in which the system enters an appropriate CPU sleep state while leaving the display subsystem components powered on.

In one embodiment, the process 200 continues at process block 212, in which the system displays content from the internal display buffer. At decision block 214, the system determines whether the display buffer is empty. If not, then the flow returns to process block 212 to continue to display content from the internal display buffer until it is empty. When empty, the process 200 repeats 216, and the flow returns to process block 204.

The above-described process 200 allows the system to take advantage of the additional power savings afforded by the by intermittently powering down the CPU to a more efficient sleep state, such as a deep sleep package C-state, whenever the system's display is active and the CPU is no longer needed.

From the foregoing description it should be apparent that the novel power supply topology that powers the display subsystem separately from the other components of the CPU, as illustrated in FIG. 1, allows the system to provide an active display processor sleep state in accordance with an embodiment of the invention. An active display processor sleep state provides significant power savings for systems during an active display workload. For example, during a video playback workload, it is anticipated that this feature will save on average 200 mw of power.

Figure 3:
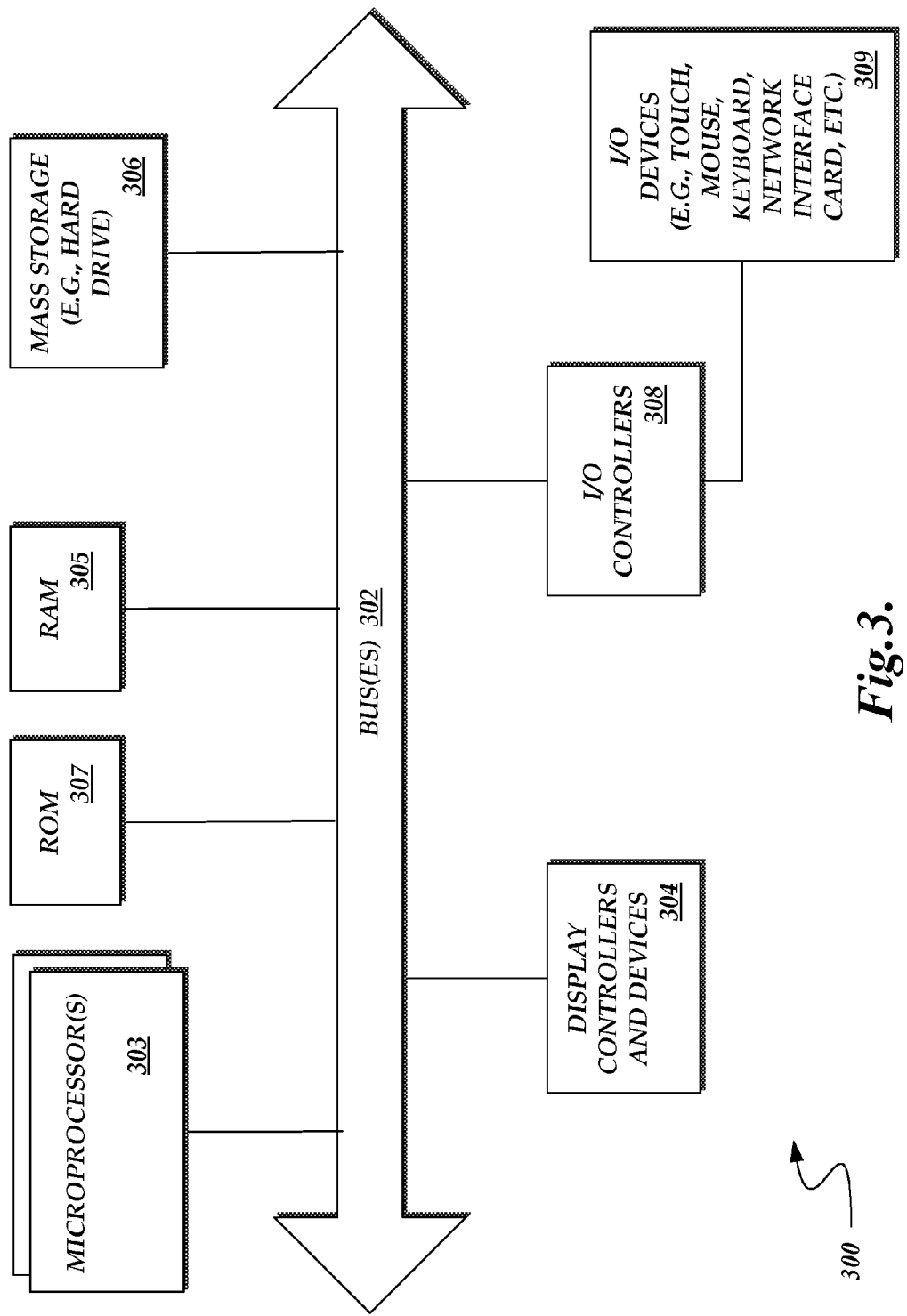
FIG. 3 illustrates an example of a typical computer system which can be used in conjunction with the embodiments described herein.

FIG. 3 illustrates an example of a typical computer system which can be used in conjunction with the embodiments described herein. Note that while FIG. 3 illustrates the various components of a data processing system, such as a computer system, it is not intended to represent any particular architecture or manner of interconnecting the components. It will also be appreciated that other types of data processing systems which have fewer components than shown or more components than shown in FIG. 3 could also be used with the present invention. The data processing system of FIG. 3 can be any type of computing device, such as a mobile or stationary computing and/or communication device including but not limited to a cell phone, smart phone, tablet computer, laptop computer, electronic book reader, desktop computer, digital camera, etc.

As shown in FIG. 3, the data processing system 300 includes one or more buses 302 which serve to interconnect the various components of the system. One or more processors 303 are coupled to the one or more buses 302 as is known in the art. Memory 305 can be DRAM or non-volatile RAM or can be flash memory or other types of memory. This memory is coupled to the one or more buses 302 using techniques known in the art. The data processing system 300 can also include mass storage 306 and non-volatile memory 307 which can be a hard disk drive or a flash memory or a magnetic optical drive or magnetic memory or an optical drive or other types of memory systems which maintain data even after power is removed from the system. The non-volatile memory 307 and the memory 305 are both coupled to the one or more buses 302 using known interfaces and connection techniques.

A display controller 304 is coupled to the one or more buses 302 in order to receive display data to be displayed on a display device 304 which can display any one of the user interface features or embodiments described herein. The display device 304 can include an integrated touch input to provide a touch screen. The data processing system 300 can also include one or more input/output (I/O) controllers 308 which provide interfaces for one or more I/O devices, such as one or more mice, touch screens, touch pads, joysticks, and other input devices including those known in the art and output devices (e.g. speakers). The input/output devices 309 are coupled through one or more I/O controllers 308 as is known in the art.

Where the system 300 is a mobile or portable system, a battery or battery connector may be included to provide power to operate the system 300 either exclusively or in the absence of another type of power source. Additionally, for some embodiments, an antenna may be included and coupled to the system 300 via, for example, a wireless local area network (WLAN) device to provide for wireless connectivity for the system 200. The wireless device may include a wireless communication module that may employ a Wireless Application Protocol to establish a wireless communication channel. The wireless communication module may implement a wireless networking standard such as Institute of Electrical and Electronics Engineers (IEEE) 802.11 standard, IEEE std. 802.11-1999, published 1999.

While FIG. 3 shows that the non-volatile memory 307 and the memory 305 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 302 may include one or more bridges or controllers or adapters to interconnect between various buses. In one embodiment, the I/O controller 308 includes a USB adapter for controlling USB peripherals and can control an Ethernet port or a wireless transceiver or combination of wireless transceivers.

It will be apparent from this description that aspects of the present invention could be embodied, at least in part, in software. That is, the techniques and methods described herein could be carried out in a data processing system in response to its processor executing a sequence of instructions contained in a tangible, non-transitory memory such as the memory 305 or the non-volatile memory 307 or a combination of such memories, and each of these memories is a form of a machine readable, tangible storage medium. In various embodiments, hardwired circuitry could be used in combination with software instructions to implement the present invention. Thus the techniques are not limited to any specific combination of hardware circuitry and software or to any particular source for the instructions executed by the data processing system.

All or a portion of the described embodiments can be implemented with logic circuitry such as a dedicated logic circuit or with a microcontroller or other form of processing core that executes program code instructions. Thus processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages could be used to implement the teachings of the invention as described herein.

In the foregoing specification, the invention has been described with reference to specific exemplary embodiments. It will be evident that various modifications could be made to the described embodiments without departing from the broader spirit and scope of the invention as set forth in the following claims. The specification and drawings are, accordingly, to be regarded in an illustrative sense rather than a restrictive sense.

What is claimed is:

1. A system comprising:
   a processor having:
      a display subsystem to display content from a display buffer of the display subsystem, wherein the display subsystem includes a display input/output (IO), a display engine, and a display phase locked loop (PLL) component, and
      an integrated voltage regulator to regulate a voltage level supplied by an external power supply to a lower voltage level, the lower voltage level suitable for powering the display engine, wherein the integrated voltage regulator is one of a linear voltage regulator (LVR) and a switched capacitor voltage regulator;

the external power supply to power the display subsystem separately from other components of the processor, wherein the processor excluding the display subsystem is to enter a sleep state when the display buffer is full and exit the sleep state when the display buffer is empty, wherein the external power supply is to supply power to the display IO; and an LC filter to filter noise from a voltage supplied by the external power supply before powering the display PLL component.

2. The system of claim 1, wherein the voltage level supplied by the external power supply is 1.0V, and the lower voltage level suitable for powering the display engine is 0.7V.

3. The system of claim 1, further comprising:
a platform control hub, wherein the external power supply is shared with the platform control hub.

4. The system of claim 1, wherein the processor further comprises a voltage regulator to power a component of the processor other than the display subsystem.

5. The system of claim 4, wherein the voltage regulator comprises an IO voltage regulator.

6. The system of claim 5, wherein the voltage regulator further comprises a system agent voltage regulator.

7. The system of claim 4, wherein the voltage regulator comprises a system agent voltage regulator.

8. A method for managing power in a processor having an integrated display subsystem, the method comprising:
powering a component of the processor with a first input voltage from a first integrated voltage regulator of the processor;
powering the integrated display subsystem in the processor with a second input voltage that is supplied via a second integrated voltage regulator of the processor and separate from the first input voltage, the integrated display subsystem to display content from an internal display buffer, wherein the integrated display subsystem includes a display IO, a display engine, and a display PLL component and wherein powering the integrated display subsystem in the processor with the second input voltage separate from the first input voltage includes filtering noise from the second input voltage before powering the display PLL component;
filling the internal display buffer of the integrated display subsystem with content;
placing the processor, excluding the integrated display subsystem, into a sleep state when the internal display buffer is full; and
exiting the sleep state when the internal display buffer is empty.

9. The method of claim 8, wherein filtering noise from the second input voltage before powering the display PLL component is performed by an LC filter.

10. The method of claim 8, wherein powering the integrated display subsystem in the processor with the second input voltage separate from the first input voltage includes:
regulating a voltage level supplied by the second input voltage to a lower voltage level, the lower voltage level suitable for powering the display engine.

11. The method of claim 10, wherein regulating the voltage level supplied by the second input voltage to the lower voltage level suitable for powering the display engine is performed with any one of a linear voltage regulator (LVR) and a switched capacitor voltage regulator.

12. The method of claim 11, wherein the voltage level supplied by the second input voltage is 1.0V, and the lower voltage level suitable for powering the display engine is 0.7V.

13. The method of claim 8, wherein the second input voltage is shared with a platform control hub operating in conjunction with the processor.

14. A processor including an integrated display driver, the processor comprising:
the integrated display driver to display content from a display buffer, the integrated display driver including a display engine, a display IO, and a display PLL component, wherein the display PLL component connects to a filter to filter noise from a display power supply for use by the display PLL component;
an internal voltage regulator to regulate a voltage level supplied by the display power supply to a lower voltage level for use by the display engine, wherein the processor enters a sleep state when the display buffer is full without affecting the display power supply for the integrated display driver, and the processor exits the sleep state when the display buffer is empty; and
a second voltage regulator to power a component of the processor other than the integrated display driver.

15. The processor of claim 14, wherein the second voltage regulator to power the component of the processor other than the integrated display driver comprises a system agent voltage regulator.

16. The processor of claim 14, wherein the second voltage regulator comprises an JO voltage regulator.

17. The processor of claim 15, wherein the second voltage regulator further comprises an JO voltage regulator.

* * * * *